(12) United States Patent
Meiyappan et al.

(10) Patent No.: US 10,231,201 B2
(45) Date of Patent: Mar. 12, 2019

(54) SYSTEMS AND METHODS FOR ASSURED TIME SYNCHRONIZATION OF AN RF BEACON

(71) Applicant: NextNav, LLC, Sunnyvale, CA (US)

(72) Inventors: Subramanian S. Meiyappan, San Jose, CA (US); Wouter Pelgrum, Mountain View, CA (US); Arun Raghupathy, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/496,448

(22) Filed: Apr. 25, 2017

(65) Prior Publication Data

US 2017/0230925 A1  Aug. 10, 2017

Related U.S. Application Data

(63) Continuation-in-part of application No. 14/954,462, filed on Nov. 30, 2015, now Pat. No. 9,967,845.

(60) Provisional application No. 62/373,511, filed on Aug. 11, 2016, provisional application No. 62/089,138, filed on Dec. 8, 2014.

(51) Int. Cl.
*H04W 56/00* (2009.01)
*H04W 40/24* (2009.01)
*H04B 7/185* (2006.01)

(52) U.S. Cl.
CPC .... *H04W 56/0015* (2013.01); *H04B 7/18528* (2013.01); *H04W 40/244* (2013.01); *H04W 56/001* (2013.01); *H04W 56/002* (2013.01)

(58) Field of Classification Search
CPC .......... H04W 56/0015; H04W 56/002; H04W 56/001; H04W 72/046; H04W 40/244; H04B 7/18528
See application file for complete search history.

(56) References Cited

U.S. PATENT DOCUMENTS

| | | | |
|---|---|---|---|
| 6,336,076 B1 * | 1/2002 | Farley | G01S 19/11 342/357.41 |
| 7,606,541 B1 * | 10/2009 | Nicholls | H04J 3/0644 455/146 |
| 2002/0142718 A1 * | 10/2002 | Nawata | H04B 7/18528 455/12.1 |
| 2004/0125822 A1 * | 7/2004 | Jun | H04J 3/0661 370/503 |
| 2006/0219776 A1 * | 10/2006 | Finn | B60R 25/25 235/380 |
| 2009/0245291 A1 * | 10/2009 | Wolfe | H04J 3/0661 370/503 |
| 2009/0289872 A1 | 11/2009 | Yang | |

(Continued)

FOREIGN PATENT DOCUMENTS

WO    WO 2012141711 A1 * 10/2012 ............... G06F 1/04

OTHER PUBLICATIONS

Meiyappan Raghupathy, U.S. Appl. No. 14/954,462, filed Nov. 30, 2015, 2016-0165562, Jun. 9, 2016.

(Continued)

*Primary Examiner* — Mohamed A Kamara

(57) ABSTRACT

Synchronizing the local time of beacons. Systems and methods discipline a high-stability local clock of a designated beacon within a geographic region to a network time, and synchronize a local clock of another beacon within the geographic region to the network time.

28 Claims, 14 Drawing Sheets

(56) References Cited

U.S. PATENT DOCUMENTS

| | | | |
|---|---|---|---|
| 2010/0220006 A1* | 9/2010 | Arab | G04G 7/026 |
| | | | 342/357.26 |
| 2011/0045788 A1 | 2/2011 | Subramaniyan | |
| 2011/0267229 A1* | 11/2011 | Gayrard | G01S 13/878 |
| | | | 342/357.31 |
| 2011/0285589 A1 | 11/2011 | Bull | |
| 2012/0182180 A1 | 7/2012 | Wolf et al. | |
| 2012/0249233 A1 | 10/2012 | Farahani | |
| 2012/0300795 A1 | 11/2012 | Joergensen | |
| 2013/0148639 A1 | 6/2013 | Gao | |
| 2013/0241607 A1 | 9/2013 | Hongou | |
| 2014/0050282 A1 | 2/2014 | Watanabe | |
| 2014/0109096 A1* | 4/2014 | Chandhoke | G06F 9/4825 |
| | | | 718/102 |
| 2014/0211781 A1 | 7/2014 | Kim | |
| 2016/0057684 A1 | 2/2016 | Larsson | |

OTHER PUBLICATIONS

Meiyappan Raghupathy Pelgrum, U.S. Appl. No. 15/496,448, filed Apr. 25, 2017.

United States Patent & Trademark Office, Office Action of U.S. Appl. No. 14/954,462, including claims under review, 35 pages, dated May 19, 2017.

Form PCT/ISA/220, PCT/US2015/062997, "Notification of Transmittal of the International Search Report and the Written Opinion of the International Searching Authority, or the Declaration", 1 page(s); Form PCT/ISA/210, PCT/US2015/062997, "International Search Report", 5 page(s); Form PCT/ISA/237, PCT/US2015/062997, "Written Opinion of the International Searching Authority", 7 page(s), dated May 17, 2016.

Form PCT/ISA/206, PCT/US2015/062997, "Invitation to Pay Additional Fees and, Where Applicable, Protest Fee", 5 page(s), dated Mar. 2, 2016.

Applicant, Response to Office Action for U.S. Appl. No. 14/954,462, including claim amendments, 11 pages, dated Nov. 13, 2017.

US Patent & Trademark Office, Office Action for U.S. Appl. No. 14/954,462, (see preceding response to office action for then-pending claims), 35 pages, dated Aug. 28, 2017.

Applicant, Response to Office Action for U.S. Appl. No. 14/954,462, including claim amendments, 11 pages, dated Aug. 11, 2017.

U.S. Patent & Trademark Office, Office Action for U.S. Appl. No. 15/941,563, include listing of claims under review, 25 pages, dated Jan. 2, 2019.

Chang et al., "A New Energy-Efficient Time Synchronization Protocol in Wireless Sensor Networks", 2014 IEEE International Conference on Computer & Information Technology, IEEE, Sep. 11, 2014, pp. 684-688, XP032702950.

\* cited by examiner

SYSTEMS AND METHODS FOR ASSURED TIME SYNCHRONIZATION OF AN RF BEACON

BACKGROUND

Determining the exact location of a mobile device (e.g. a mobile phone) in an environment can be quite challenging, especially when the mobile device is located in an urban environment, or is located within a building. Imprecise estimates of the mobile device's position may have "life or death" consequences for the user. For example, an imprecise position estimate for a mobile device, such as a mobile phone operated by a user calling 911, can delay emergency personnel response times when responding to the call. In less dire situations, imprecise estimates of the user's position can negatively impact efforts to provide navigation to a desired destination.

Positioning systems used to estimate the position of the mobile device, like the Global Positioning System (GPS), have been in use for many years. Unfortunately, poor signal conditions found in urban and indoor environments may degrade the performance of these conventional positioning systems. To improve positioning accuracy in urban and indoor environments, GPS may be replaced or augmented by positioning systems that use terrestrial beacons, such as those in cellular phone networks, those described in U.S. Pat. No. 8,130,141 and U.S. Pat. No. 9,057,606, or others.

Such systems may transmit positioning/timing signals from multiple beacons of known locations to the mobile device in order to generate pseudoranges that may then be used when generating a position estimate of the mobile device. As is known in the art, a pseudorange may be derived using an estimated time-of-flight of the transmitted positioning/timing signal transmitted by a beacon to the mobile device—i.e., the time during which the signal was in transit between its time of departure from the beacon and the time of arrival at the mobile device. Since the estimated position of the mobile device may be generated using pseudoranges associated with multiple beacons, it follows that the accuracy of the estimated position of the mobile device will be affected by the degree to which the clocks of the multiple beacons are synchronized between themselves.

Unfortunately, synchronization of beacons in terrestrial positioning networks can be difficult or expensive to achieve. For example, a network may rely on providing a time synchronization RF signal to each beacon from a centralized source (e.g. a GNSS, USNO, or another satellite time source). However, some beacons may be unable to receive that synchronization signal from the centralized source, or the cost to provide that synchronization signal from the centralized source to particular beacons is too high. Thus, network-wide and cost-effective approaches for synchronizing a beacon's clock are needed.

DETAILED DESCRIPTION

Many terrestrial communication systems use beacons that transmit radio frequency ("RF" or "radio") signals at certain times and sit "idle" at other times. It follows that the periods of time when a beacon sits idle can be used to perform other useful functions. As disclosed below, a beacon's circuit topology can be modified to allow a beacon to receive and process RF signals from another source (e.g. another beacon) when that beacon is not transmitting its own RF signals. Receiving and processing such RF signals has many uses, including uses discussed herein. However, before discussing the modifications to beacon circuit topology, a review of such circuit topology and other features of a terrestrial beacon network are provided below with reference to FIG. 1 and FIG. 2.

Figure 1:
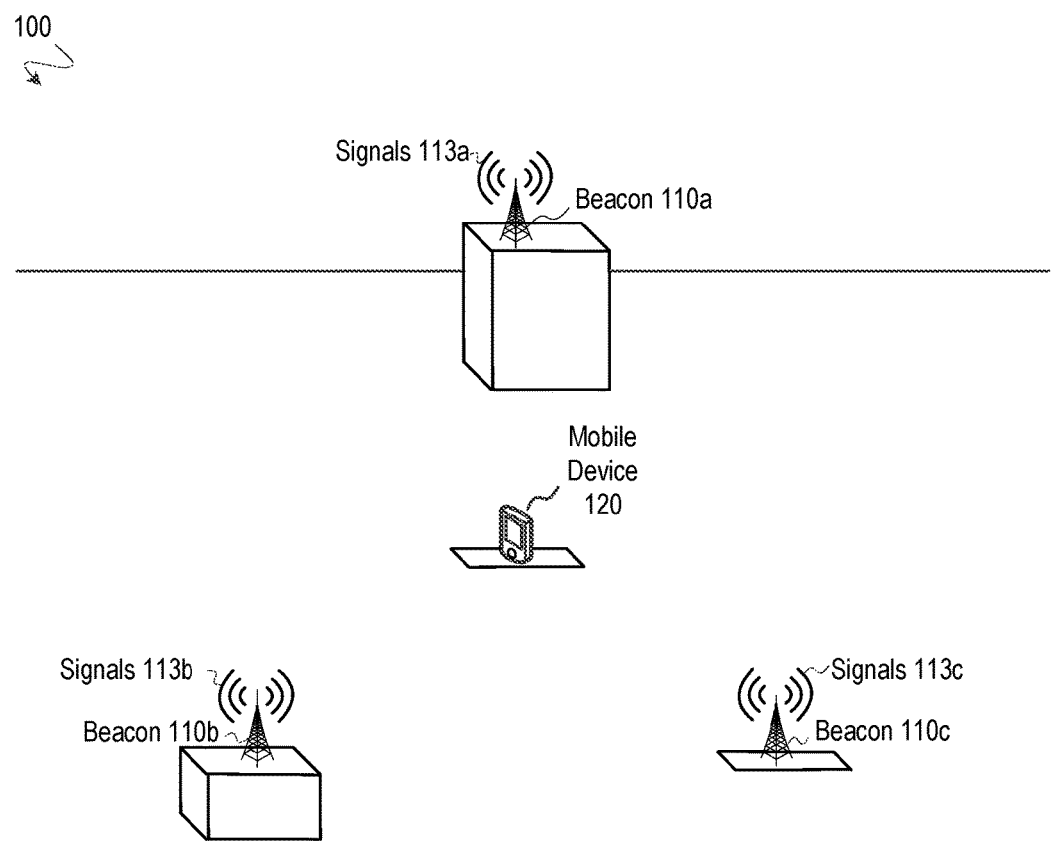
FIG. 1 depicts a terrestrial positioning system used to determine the position of a mobile device.

FIG. 1 depicts a terrestrial positioning system used to determine the position of a mobile device. As shown, beacons 110 transmit signals 113, which are received by a mobile device 120. The mobile device 120 may use each of the signals 113 from each of the beacons 110 to compute ranging information that estimates a distance from the mobile device 120 to the beacon 110 that transmitted that signal 113 for use during trilateration to compute an initial estimate of the mobile device 120's position.

Figure 2:
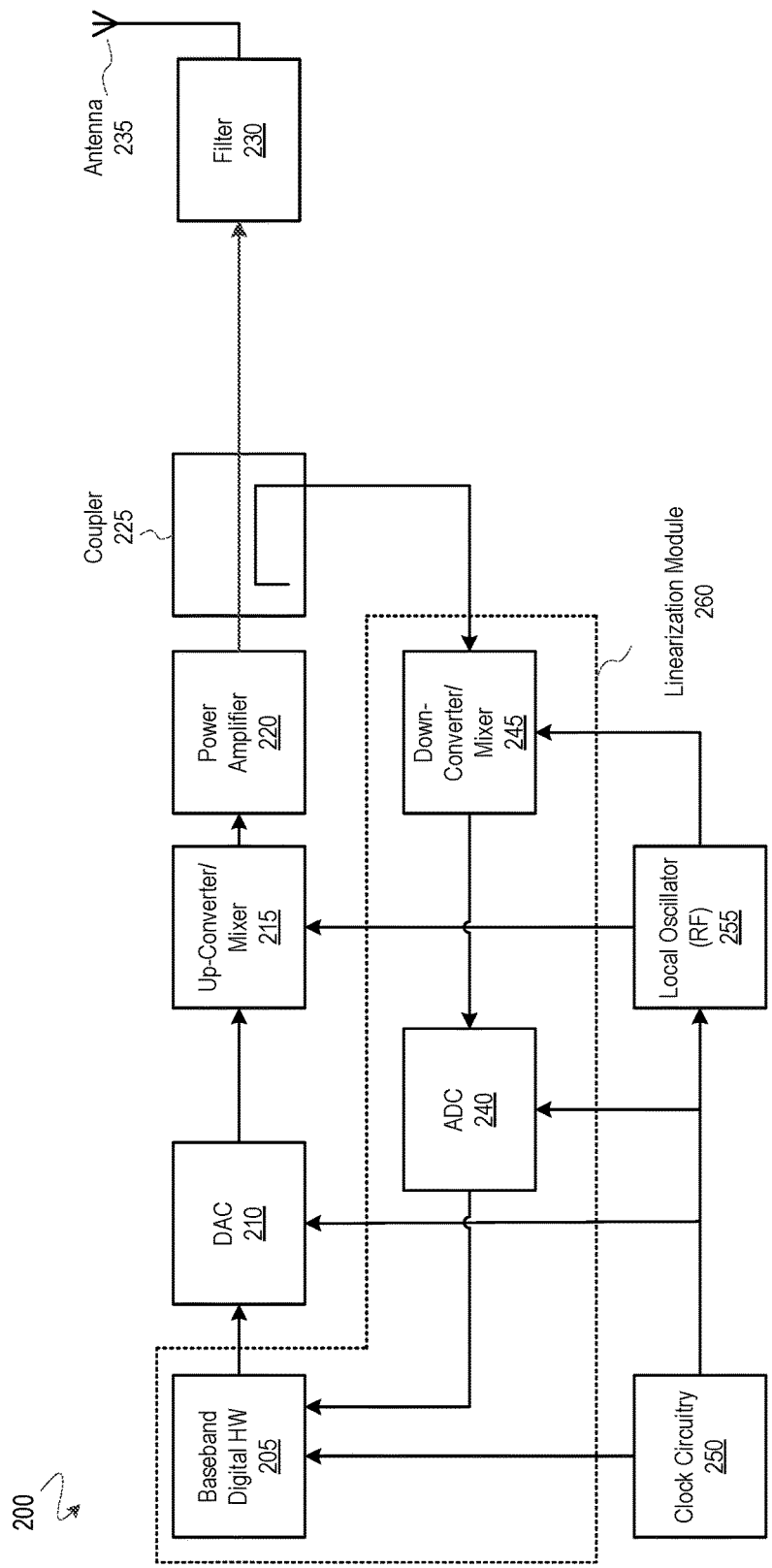
FIG. 2 depicts a typical beacon circuit topology.

By way of example, FIG. 2 depicts a typical circuit topology of a terrestrial beacon 200, which may be implemented by each of the beacons 110 of FIG. 1. Such beacons often use a power amplifier (PA) to transmit the modulated signal over the air for long distances. Some beacons employ linearization techniques using a linearization module (e.g. a digital pre-distortion (DPD) module) to achieve a high degree of linearity in their power amplifiers with an added benefit of reducing power consumption and improved thermal characteristics. Such linearization techniques are implemented in the beacon of the system 200.

In the beacon 200, a digitally modulated baseband signal generated by baseband digital hardware 205 is converted to an analog signal using a digital to analog converter (DAC) 210. The analog signal is then up-converted (e.g. mixed up) to an RF signal of the desired RF frequency using an up-converter 215. The RF signal is then amplified using the power amplifier 220. The amplified RF signal passes through a coupler 225 and is then filtered by a filter 230. Finally, the filtered, amplified RF signal is transmitted over the air through an antenna 235. In one embodiment, the antenna 235 may include one or more filters.

In order to linearize the power amplifier 220 (e.g. using DPD techniques), the power amplifier output is coupled through the coupler 225 to a receive path of a down-converter 245. The down-converter 245 mixes the RF signal down to baseband frequency (or an intermediate frequency, IF). The baseband signal is then received by an analog to digital converter (ADC) 240 which creates a digital representation of the analog baseband signal. The digital representation from the ADC 240 is then used in the baseband digital hardware 205 to "pre-distort" the next transmitted waveform to achieve the desired linearity, using signal processing techniques known in the art.

As previously mentioned, many terrestrial communication systems use beacons that transmit RF signals at certain times and sit "idle" at other times. For example, such systems that re-use the same transmit frequency among the beacons of a network operate using a time-divisional multiple access (TDMA) scheme to minimize the impact of the near-far problem, and thus have transmission and idle periods of time for each beacon. As is disclosed below in relation to FIG. 3, beacon circuit topology like that of FIG. 2, can be modified to allow a beacon to receive and process RF signals from other sources when that beacon is not transmitting its own RF signals.

Figure 3:
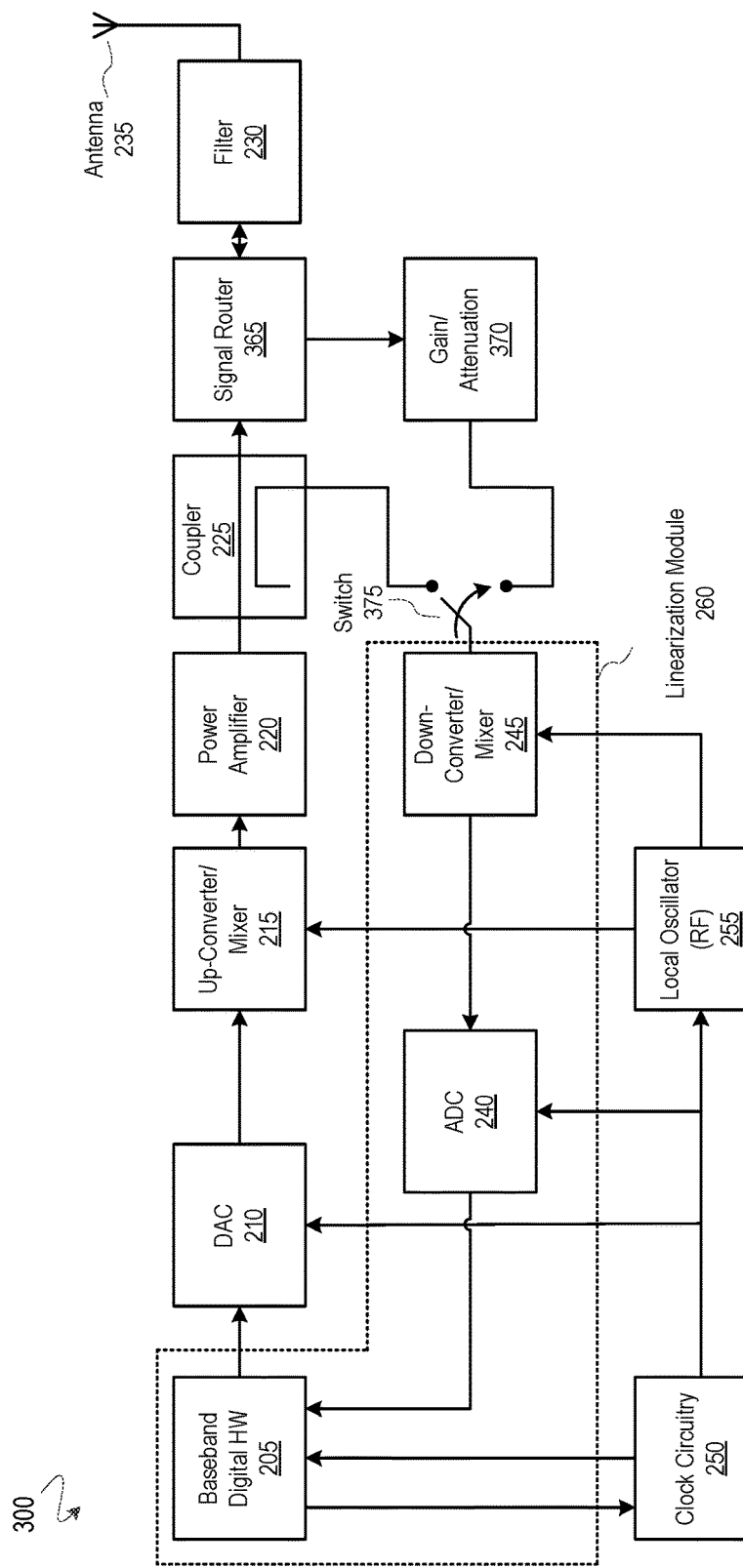
FIG. 3 depicts the beacon circuit topology of FIG. 2 which has been modified to allow the beacon circuitry to process received radio frequency (RF) signals when it is not transmitting RF signals.

FIG. 3 depicts circuitry topology of a beacon 300 that allows the beacon 300 to process received RF signals when the beacon 300 is not transmitting RF signals.

The power amplifier linearization module 260 has a receive chain built in to listen to self-transmission as was described at FIG. 2. With certain modifications to beacon circuit topology, the beacon 300 receives and processes signals from other beacons during when the beacon 300 is not transmitting. In one embodiment, if the transmitted signal power of the beacon 300 is low enough, the beacon 300 can receive signals transmitted from other beacons while the beacon is transmitting.

As shown in FIG. 3, the beacon 300 includes components previously described in relation to FIG. 2. The beacon 300 also includes a signal router 365 (e.g. an RF circulator, switches, or RF isolators) which may help protect the PA 220 from reflections from the antenna 235. Using the signal router 365 one can use the isolated path of the signal router 365 to receive signals from other beacons when the beacon is not transmitting RF signals. Alternative embodiments include other hardware components, such as RF isolators or switches, which can provide an isolated path for signals received from other beacons by the antenna 235.

The beacon 300 also includes a signal gain/attenuation component 370 (e.g. a signal conditioning component such as an Auto-Gain Control (AGC)). Based on the received signal strength, a gain or attenuation factor may be applied using the gain/attenuation component 370 to be able to receive both strong and weak signals from other beacons. In some embodiments, the gain/attenuation component 370 may be switched off when the power amplifier 220 is operating to prevent the output signal of the power amplifier from damaging the gain/attenuation component 370.

The beacon 300 further includes a switch 375 that may be used to selectively configure the beacon 300 to send or receive RF signals. Such a switch may be a relay; it may be a solid state switch; it may be a buffered circuit, or it may be any other suitable means which allows an RF signal to be selectively routed to multiple paths.

Using this modified beacon topology for the beacon 300, RF signals received at the antenna 235 will flow through the filter 230 to the signal router 365, and will then flow from the isolated path of the signal router 365 to the gain/attenuation component 370.

If the switch 375 is configured to route the received signals to the down-converter 245, the signals may be then processed using the existing power amplifier linearization module 260 to extract any digital data what was conveyed in the received RF signal. By way of example, such data may contain, or support, time of arrival estimates which can then be used for two-way time transfer techniques as will be described with reference to FIG. 10. Time synchronization data generated with such techniques may be used to control the clock circuitry 250 (e.g. a local clock) such that the clock circuitry 250 remains in synchronization with the clock circuitry of other beacons in both time and frequency. The baseband digital hardware 205 is enabled to supply clock synchronization signals/commands to the clock circuitry 250.

In an alternative embodiment, an independent receiver (not shown) is coupled to the signal router 365 to receive signals received at the antenna 235.

The circuitry shown in FIG. 3 permits enhancements in the way beacons are synchronized, since received data processed at the baseband digital hardware 205 may be used to synchronize the local clocks of beacons of a network to each other using two-way time transfer techniques. Other uses of received data have been contemplated, including uses of received data for monitoring the health of the beacon network.

As would be understood by one of skill in the art, beacons may include: one or more memory module(s) for providing storage and retrieval of data and/or instructions relating to methods of operation described herein that may be executed by processing module(s) or other module(s); interface module(s) for exchanging information with other systems via other links other than a radio link; and other modules that are known in the art.

Particular processes for time synchronizing beacons are described later with reference to FIG. 9 through FIG. 11. However, various systems depicted in FIG. 4 through FIG. 8 are first discussed below to provide context for such time synchronizing processes.

Systems for Beacon Clock Synchronization Using Two-Way Time Transfer

Figure 4:
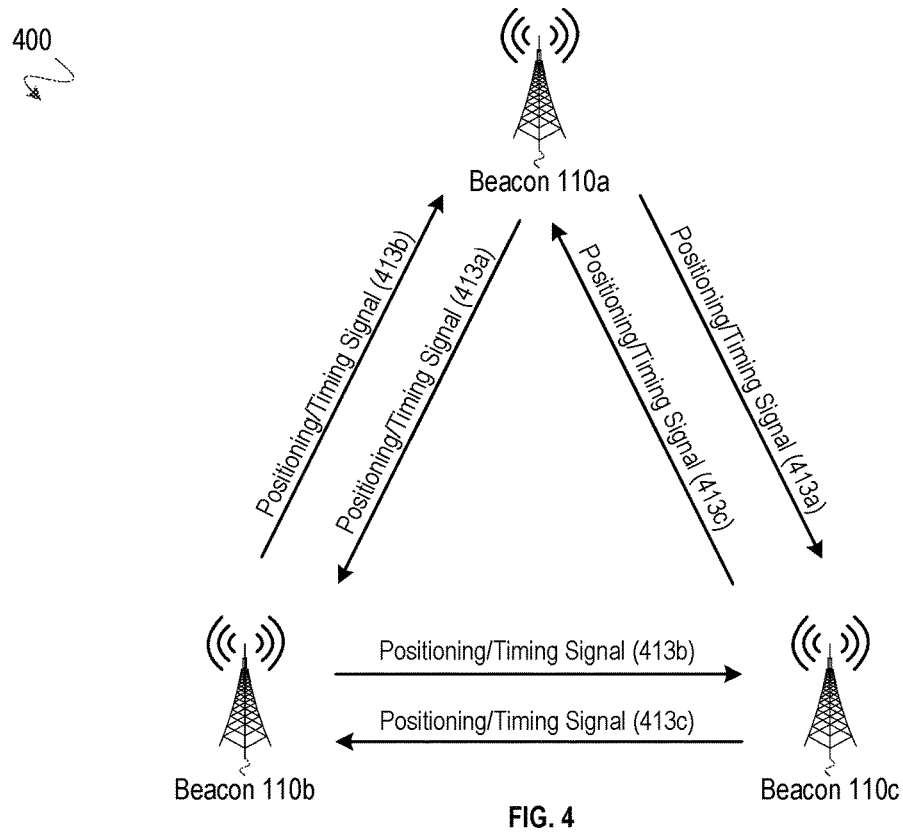
FIG. 4 depicts beacons of the terrestrial positioning system exchanging positioning and/or timing signals between themselves to synchronize their clocks relative to each other using two-way time transfer.
Figure 5:
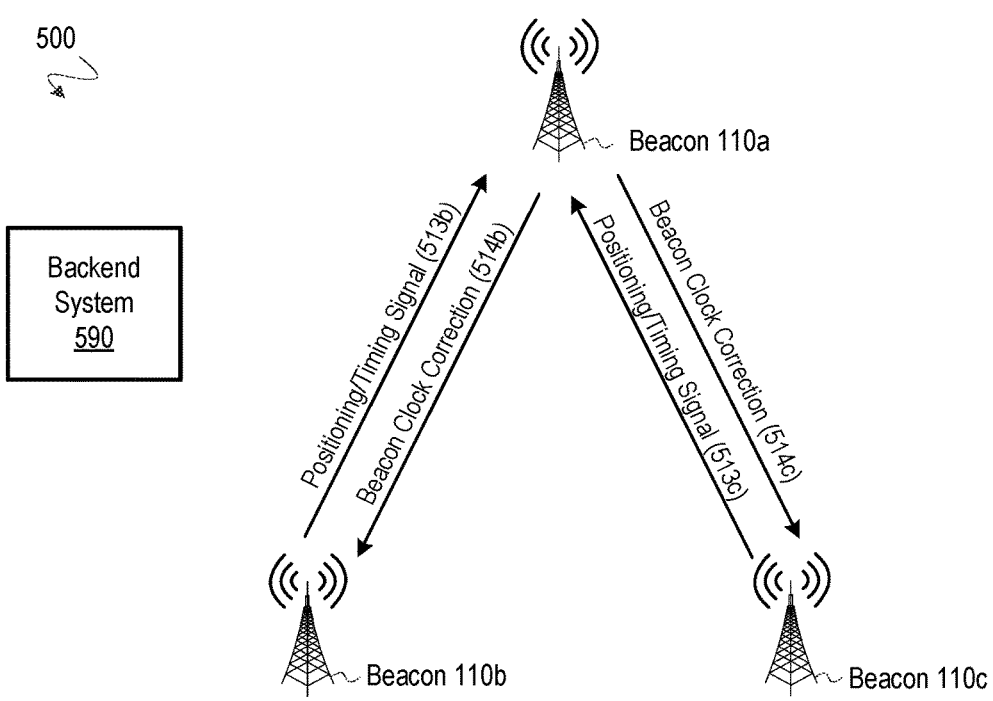
FIG. 5 depicts beacons sending positioning/timing signals to a single beacon of the network which in turn returns clock synchronization corrections to the other beacons.

FIG. 4 and FIG. 5 depict systems for beacon clock synchronization using two-way time transfer. Processes for time synchronization implemented by the systems shown in FIG. 4 and FIG. 5 are discussed in relation to FIG. 10.

FIG. 4 depicts the beacons 110a-c exchanging positioning and/or timing signals 413 between themselves to synchronize their clocks relative to each other using two-way time transfer techniques.

FIG. 5 depicts beacons the 110b and 110c sending positioning/timing signals 513 to the beacon 110a of the network which in turn returns clock synchronization corrections 514 to the beacons 110b and 110c.

Systems for Beacon Clock Synchronization to a Network Clock Time

Figure 6:
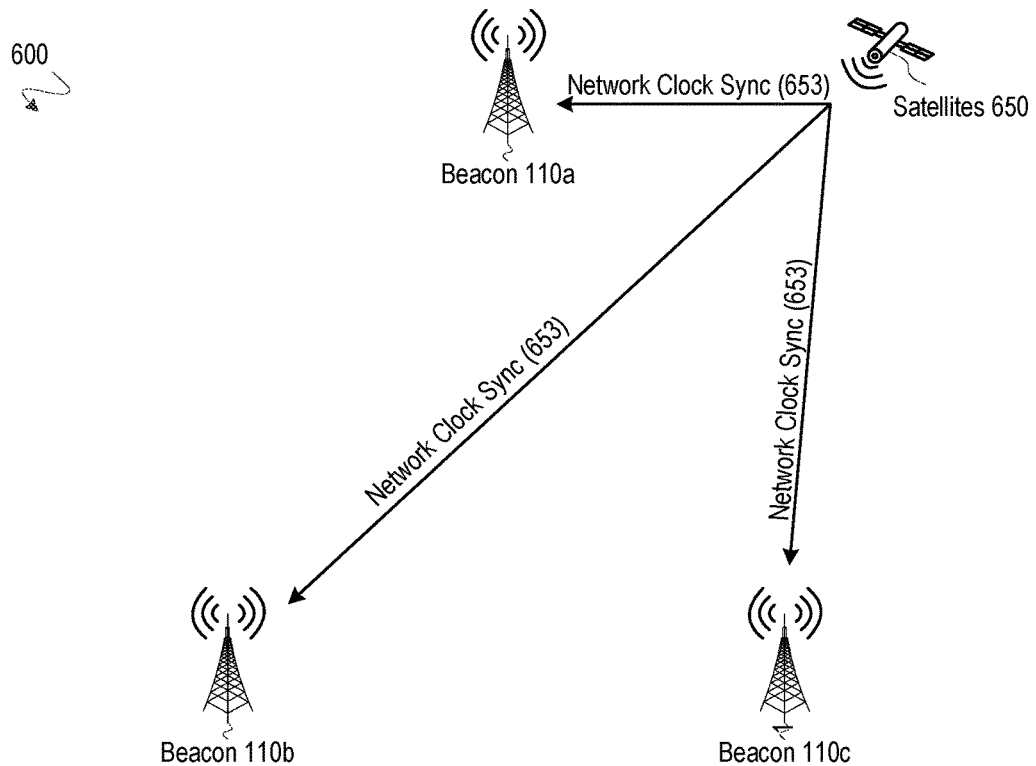
FIG. 6 depicts beacons of the terrestrial positioning system receiving a network/global time synchronization setting from a satellite beacon.
Figure 7:
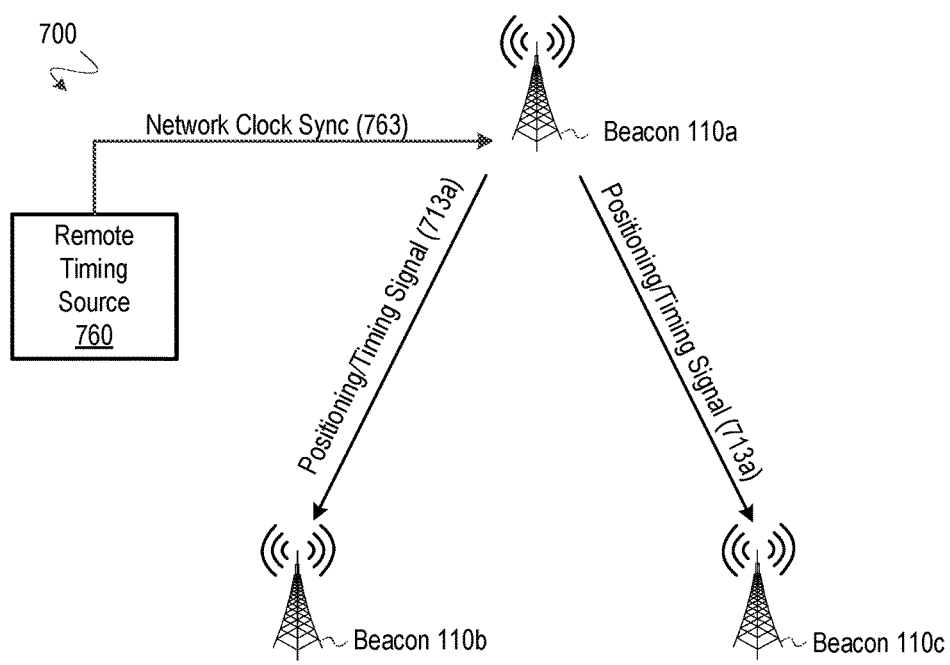
FIG. 7 depicts beacons of the terrestrial positioning system receiving a network/global time synchronization setting from a remote timing source.
Figure 8:
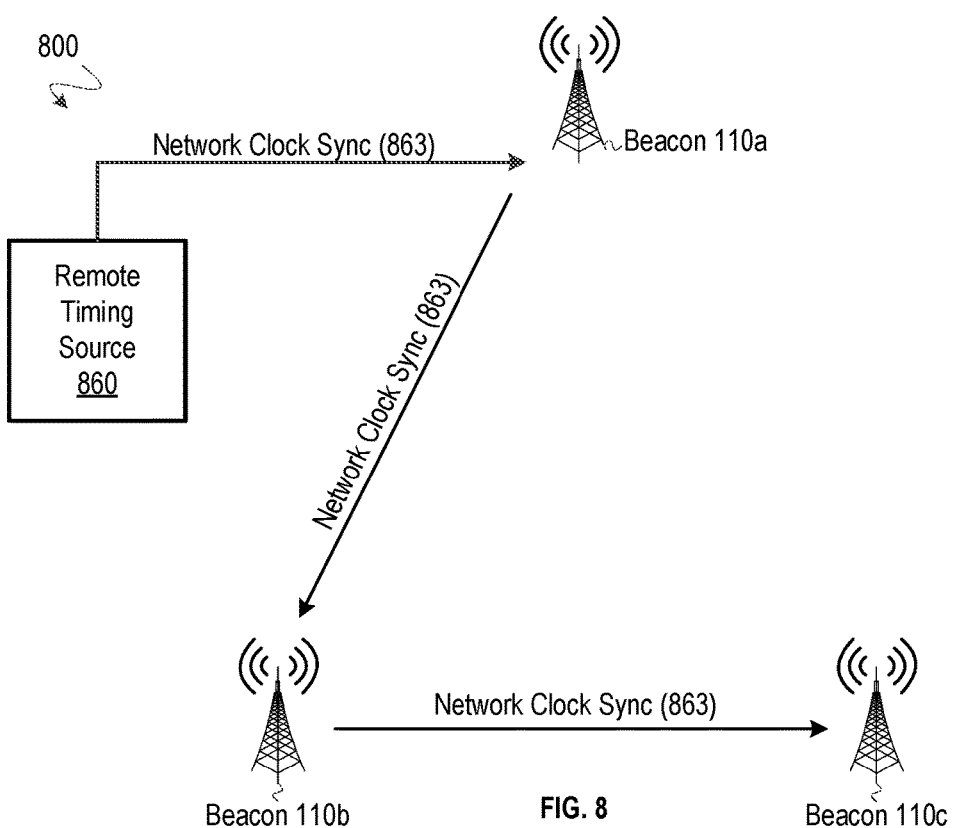
FIG. 8 depicts beacons of the terrestrial positioning system receiving, and relaying, a network/global time synchronization setting from a remote timing source.

FIG. 6 through FIG. 8 depict systems for beacon clock synchronization to a network clock time. Processes for time synchronization implemented by the systems shown in FIG. 6 through FIG. 8 are discussed at FIG. 11.

FIG. 6 depicts the beacons 110a-c receiving a network/global time synchronization setting 653 from a satellite 650.

FIG. 7 depicts the beacons 110a-c receiving a network/global time synchronization setting 763 from a remote timing source 760. As shown, the network clock synchronization signal 763 is first received by the beacon 110a. The beacon 110a uses the network clock synchronization signal 763 to synchronize its clock to the network/global time conveyed in the network clock synchronization signal 763. Thereafter, positioning/timing signal 713a transmitted to the beacon 110b and the beacon 110c will be synchronized to the network/global time. The remote timing source can be a timing source from a satellite network or a terrestrial network. For example, a satellite of the GNSS, a terrestrial satellite terminal, a terrestrial server, a terrestrial reference clock, or another reference timing source as is known in the art.

FIG. 8 depicts the beacons 110a-c receiving and relaying a network/global time synchronization setting 863 from a remote timing source 860. As shown, network clock synchronization signal 863 is first received by the beacon 110a, which then in turn signal to the beacon 110b, which in turn relays the signal to the beacon 110c, and so on for additional beacons (not shown).

Selectively Configuring RF Signal Transmission and Reception

Figure 9:
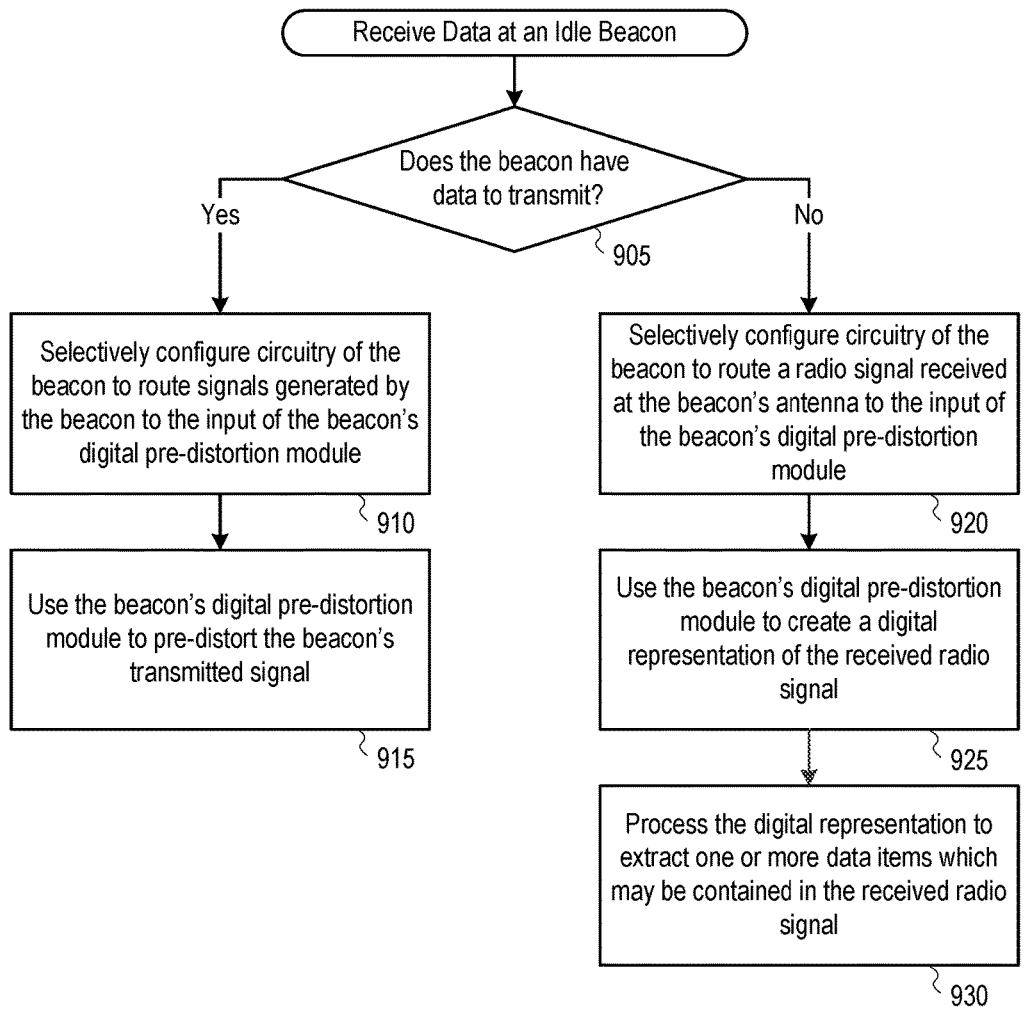
FIG. 9 details a process for identifying data items transmitted by RF signals received at a beacon when the beacon is not transmitting RF signals.

Attention is now drawn to FIG. 9, which details a process for identifying data (also referred to as "data items") transmitted by RF signals received at a beacon when the beacon is not transmitting RF signals. Such a system is supported by the beacon circuit topology illustrated in FIG. 3.

The process includes the step of: determining if the beacon has data to transmit (step 905). If the beacon has data to transmit, the process proceeds to the steps of: selectively configuring circuitry of the beacon to route signals generated by the beacon to the input of the beacon's digital pre-distortion module (step 910); and using the beacon's digital pre-distortion module to pre-distort the beacon's transmitted signal (step 915). If the beacon does not have data to transmit, the process proceeds to the steps of: selectively configuring the circuitry of the beacon to route a RF signal received at the beacon's antenna to the input of the beacon's digital pre-distortion module (step 920); using the beacon's digital pre-distortion module to create a digital representation of the received RF signal (step 925); and processing the digital representation to extract one or more data items which may be contained in the received RF signal (step 930). In one embodiment, the circuitry of the beacon is "selectively configured" in steps 910 and 920 using the switch 375 shown in FIG. 3.

Figure 10:
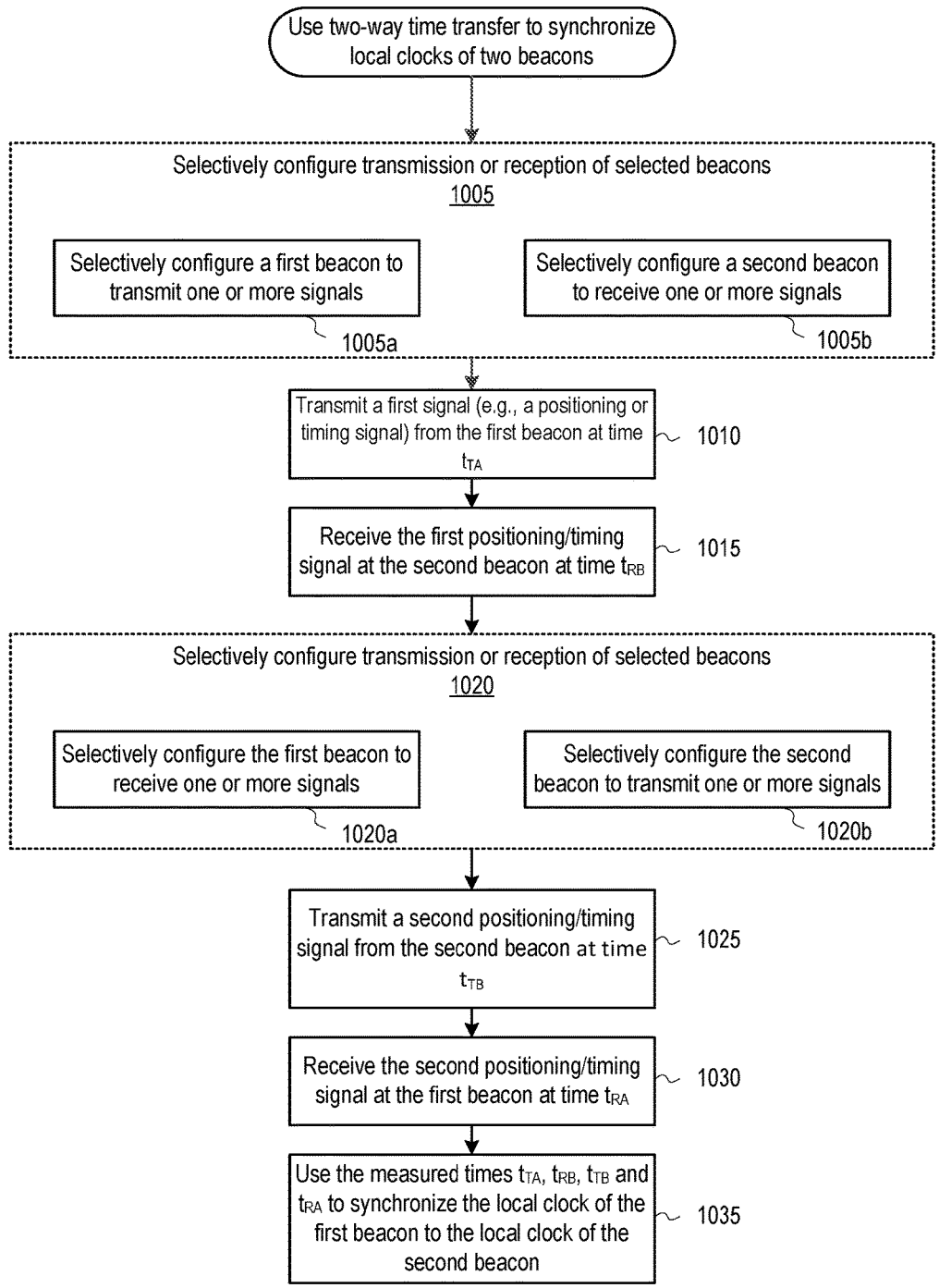
FIG. 10 details a process for using two-way time transfer to synchronize the local clocks of two beacons.

Selectively Transmitting and Receiving RF Signals at a Beacon in Support of Clock Synchronization Using Two-Way Time Transfer FIG. 10 details a process for using two-way time transfer to synchronize the local clocks (clock circuitry) of two beacons. The process includes the steps of: selectively configuring a first beacon to transmit one or more signals (step 1005a); selectively configuring a second beacon to receive one or more signals (step 1005b); transmitting a first signal (e.g. a positioning or timing signal) from the first beacon at time $t_{TA}$ (step 1010); receiving the first signal at the second beacon at time $t_{RB}$ (step 1015); selectively configuring the first beacon to receive one or more signals (step 1020a); selectively configuring the second beacon to transmit one or more signals (step 1020b); transmitting a second signal from the second beacon at time $t_{TB}$ (step 1025); receiving the second signal at the first beacon at time $t_{RA}$ (step 1030); and using the measured times $t_{TA}$, $t_{RB}$, $t_{TB}$ and $t_{RA}$ to synchronize the local clock of the first beacon to the local clock of the second beacon (step 1035).

Using such techniques, the clocks of terrestrial beacons can be synchronized with each other. Due to imperfections (e.g. propensity to drift, oscillator/crystal errors, etc.) in beacon clock hardware, the time scale of a beacon's local clock relative to other beacon's clocks may be different. These imperfections may cause a loss in time synchronization between the beacons, which can reduce the effectiveness of the network for positioning and its other uses.

To elaborate on the above process using a simplified example, consider the beacons 110a and 110b of the beacons shown in FIG. 4. Each of the beacons 110a and 110b includes hardware and circuitry capable of RF signal transmission. Using the modifications to the circuitry of the beacons as illustrated in FIG. 3, and further using the method to selectively configure the circuitry to send or receive RF signals as described at FIG. 9 and FIG. 10, each beacon can be selectively configured to transmit data when it has data to transmit, and receive data when it does not have data to transmit.

At a first time, the beacon 110a is selectively configured to transmit signals and the beacon 110b is selectively configured to receive signals. The beacon 110a transmits the signal 413a (e.g. a positioning or timing signal) at time $t_{TA}$ as measured using the local time of the beacon 110a's clock. The beacon 110b receives the signal 413a at time $t_{RB}$ as measured using the local time of the beacon 110b's clock. By way of example, the positioning or timing signals may include a representation of that beacon's respective location, the time of transmission of the signal as measured at that beacon, and other information as is known in the art.

At a second time, the beacon 110a is selectively configured to receive signals and the beacon 110b is selectively configured to transmit signals. The beacon 110b then transmits the signal 413b at time $t_{TB}$ as measured using the local time of the beacon 110b's clock. The beacon 110a receives the positioning/timing signal 413b at time $t_{RA}$ as measured using the local time of the beacon 110a's clock.

A receiving beacon's processing latency for each of the signals may be fixed or variable, but the latency can be accurately estimated using methods known in the art.

The difference in beacon clock time scale for beacons 110a and 110b will be denoted as $\Delta t_{AB}$. In order to synchronize the clocks of the beacon 110a and the beacon 110b, $\Delta t_{AB}$ must be determined.

In the equations that follow, that the distance between the beacon 110a and the beacon 110b is R meters, and the speed of light (modeled for electromagnetic wave propagation) is c. Thus:

$$t_{RB} = t_{TA} - \Delta t_{AB} + \frac{R}{c} \quad \text{(Equation 1)}$$

$$t_{RA} = t_{TB} + \Delta t_{AB} + \frac{R}{c}. \quad \text{(Equation 2)}$$

Adding Equation 1 and Equation 2 yields:

$$t_{RA} - t_{TB} + t_{RB} - t_{TA} = \frac{2R}{c}. \quad \text{(Equation 3)}$$

And subtracting Equation 1 and Equation 2 yields:

$$t_{RA} - t_{TB} - t_{RB} - t_{TA} = 2\Delta t_{AB} \quad \text{(Equation 4)}.$$

By inserting the actual measured timestamp parameters $t_{RA}$, $t_{TB}$, $t_{RB}$ and $t_{TA}$ into Equation 4, the value of $\Delta t_{AB}$ may be determined and corrected for to synchronize the clocks of the beacons 110a and 110b. This process may then be repeated between other beacons of the network.

Additionally, Equation 3 may be used as a way of measuring the range R between the beacons and can be used to bound the accuracy of the measurement of $\Delta t_{AB}$ or to validate the measurements used in determining $\Delta t_{AB}$.

In terrestrial beacons involving range estimation, multipath is a major factor that affects the measurement of the time of arrival parameters $t_{RA}$ and $t_{RB}$. However, in this case, since the beacon 110a and the beacon 110b use the same antennas to transmit and receive signals, multipath cancels out so long as the channel between the beacons is reciprocal and the inaccuracies in estimation of the time of arrivals will not factor into the accuracy of the two-way time transfer.

Inaccuracies in beacon and receiver electronics across component variations and temperature variations may be corrected for using a pre-calibrated lookup table that accounts for these variations.

Computing the value of $\Delta t_{AB}$ as described above could take place at each beacon (e.g. using the baseband digital hardware 205). Alternatively, the measured times of transmission and reception could be sent to a single beacon of the network, or to a backend system 590 of the network (e.g. a server), which takes all of the time transfer information from various beacons within a region and computes the correction information and sends it back to the beacons within the region. Such a system is illustrated in FIG. 5.

Selectively Transmitting and Receiving Signals at a Beacon in Support of Beacon Clock Synchronization to a Network Clock Time In some embodiments, there may be need to synchronize all of the beacons of a network to a single common "network time" such as the Coordinated Universal Time (UTC).

Figure 11:
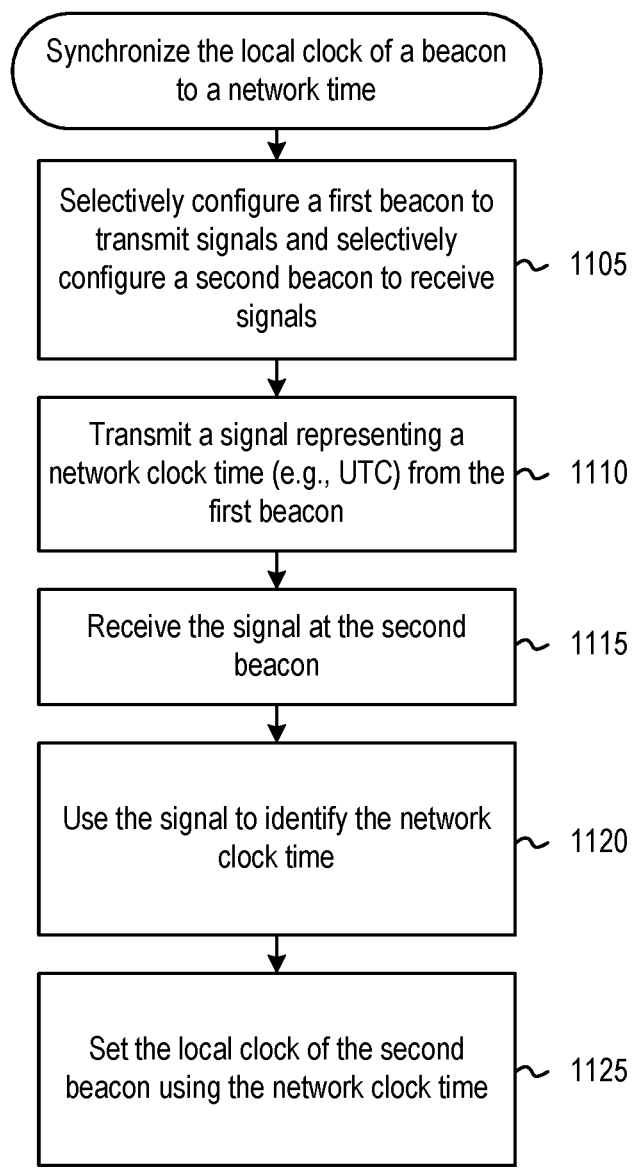
FIG. 11 details a process for synchronizing local clocks of beacons to network time.

FIG. 11 details a process for synchronizing the local clock circuitry of a beacon to a network clock time. Example systems that illustrate synchronizing a beacon to a network time are shown in FIG. 6 through FIG. 8.

The steps of the process include: selectively configuring a first beacon to transmit signals and selectively configuring a second beacon to receive signals (step 1105); transmitting a signal representing a network clock time ("network time") (e.g. UTC) from the first beacon (step 1110); receiving the signal at the second beacon (step 1115); using the signal to identify the network clock time (step 1120); and setting the local clock of the second beacon using the network clock time (step 1125).

By way of example, use of a remote timing source to synchronize beacons of a network is illustrated in FIG. 7 and FIG. 8. In these figures, the beacon 110a receives a network clock synchronization signal 763 or 863 from the remote timing source 760 or 860 which includes a high precision timing source (e.g. a timing source having greater long-term accuracy than the local clock of the beacon 110a). The beacon 110a then relays the network clock synchronization signal 763 or 863 to at least one beacon of the network.

An extension of this concept includes providing the remote timing source 760 or 860 with a high grade clock source (e.g. a timing source having at least a threshold amount of long-term accuracy, such as a Cesium or a Hydrogen Maser based timing source) that synchronizes to UTC (e.g. once a year) and becomes the main timing source for time synchronization signals for beacons within a region, thus allowing the beacons within the region to use a lower quality/cheaper clock.

As shown in FIG. 6, an alternative way of synchronizing the beacons to UTC is to use a GNSS timing receiver at each beacon site, since a GNSS receiver can provide signals synchronized to UTC. Alternatively, the satellite timing source could be the timing information from an Iridium satellite. An embodiment illustrating receiving a network clock synchronization signal 653 from a satellite system 650 is shown at FIG. 6.

Another timing source that could be used is the Two-Way Satellite Time Transfer (TWSTT) VSAT terminal (not shown), provided as a service by the United States Naval Observatory (USNO).

Assured Time Synchronization of a Beacon

In one embodiment, beacons 110 of the positioning system 100 are "self-synchronized" using a GNSS receiver and a local clock (e.g. a Rubidium clock) at each of the beacons. GNSS signals received at the beacon provide both phase synchronization and Time of Day (TOD). GNSS receivers are inexpensive and hence may be installed in every beacon in order to discipline the local clock. In the case of a GNSS outage for short periods of time (e.g. 10 minutes) at a beacon 110, a managed Rubidium clock source in each of the beacons provides holdover capabilities with little degradation in location or timing performance at a mobile device. GNSS outages beyond a short duration will result in a beacon being taken out of service if position estimation accuracy is to be maintained at non-outage levels. Even with one or two deployed beacons 110 being non-functional due to a GNSS outage around the vicinity of the mobile device, redundancy in the positioning system allows the mobile device to continue to generate position/timing fixes without significant reduction in performance.

In some situations, GNSS signals may be unavailable or undesirable to the beacons of the positioning network. In order to maintain absolute time at a beacon in lieu of GNSS signals, a two-way satellite time transfer (TWSTT) between a beacon and a non-GNSS satellite disciplining-signal source (e.g. a USNO satellite) is performed to provide absolute time, phase and frequency through the TWSTT service. A high-stability local clock (e.g. a Cesium clock source) is used at the beacon to maintain synchronization to the network time (e.g. UTC) over longer periods of time (e.g. phase synchronization of 1 µs for a period of a month).

However, it may be cost prohibitive to deploy either USNO TWSTT modules and/or a Cesium clock source at each of the beacons within a positioning system. Thus, in one embodiment, Cesium clock sources are installed at one or more designated beacon sites in a geographical area (e.g. a 50 Km radius or ~6000 sq. miles) and the remaining beacons within the geographical area, having Rubidium clock sources, derive their clocks from the designated beacon(s) through a two-way time transfer mechanism as has been previously described.

Figure 12:
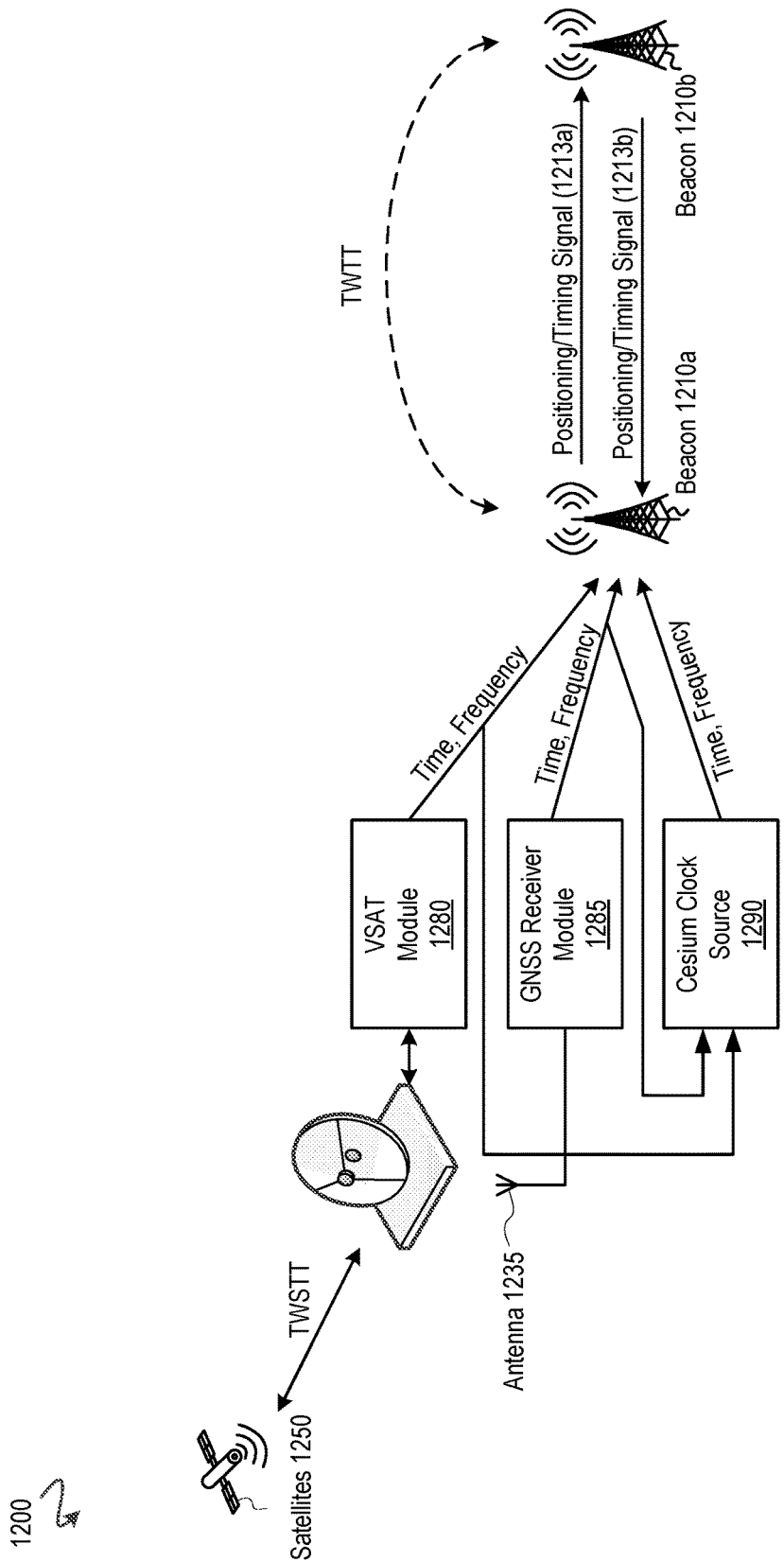
FIG. 12 depicts an operational environment for synchronizing the local time of beacons.

Attention is now turned to FIG. 12, which depicts an operational environment for synchronizing the local time of beacons. As shown, a very small aperture terminal (VSAT) module 1280 performs TWSTT with a non-GNSS satellite 1250 in order to determine the network time. Network timing information is transmitted to a designated beacon 1210a which receives timing signals from one or more sources. These sources include: the VSAT module 1280; a GNSS receiver module 1285; and a Cesium clock source 1290. In one embodiment, the Cesium clock source 1290 and the VSAT module 1280 are at the same designated beacon. In another embodiment, the Cesium clock source 1290 and the VSAT module 1280 are at different designated beacons.

The designated beacon 1210a then performs TWTT with another beacon 1210b in order to synchronize the local clock of the other beacon 1210b to the local clock of the designated beacon 1210a. In one embodiment, local clock synchronization between the designated beacon 1210a and the other beacon 1210b is maintained to within 100 nano-seconds with respect to the local clock of the designated beacon 1210a at all times.

Figure 13:
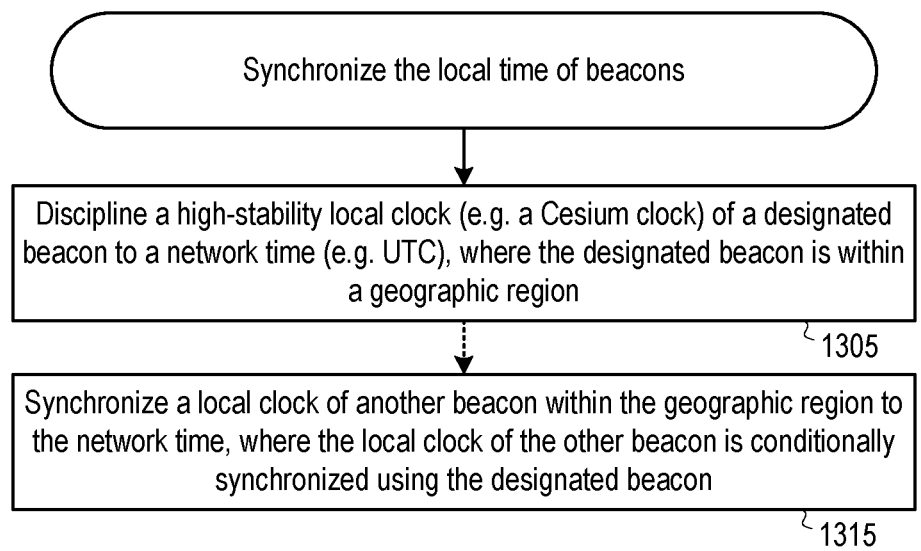
FIG. 13 details a process for synchronizing the local time of beacons.

Attention is now turned to FIG. 13, which details a process for synchronizing the local time of beacons. As shown, at step 1305 a high-stability local clock of a designated beacon is disciplined to a network time (e.g. using a disciplining-signal source such as a USNO satellite), where the designated beacon is within a geographic region. Then, at step 1315, a local clock of another beacon within the geographic region is synchronized to the network time, where the local clock of the other beacon is conditionally synchronized using the designated beacon. Step 1305 and step 1315 could occur at separate dates and times.

In one embodiment, the high-stability local clock includes a timing source that maintains phase synchronization with the network time to within 1 micro-second for a time period of greater than or equal to a month in the absence of a disciplining signal, and the local clock of the other beacon maintains phase synchronization with the network time to within 1.5 micro-second for a time period of less than a month in absence of a disciplining signal. In another embodiment, the local clock of the other beacon maintains phase synchronization with the network time to within 1.5 micro-second for a time period of less than or equal to 24 hours in absence of a disciplining signal. In one embodiment, the high-stability local clock of the designated beacon comprises a Cesium clock, and the local clock of the other beacon does not comprise a Cesium clock.

In one embodiment, synchronization between the high-stability local clock of a designated beacon and the local clock of another beacon is maintained to within 100 nano-seconds with respect to the high-stability local clock of the designated beacon at all times. Clock disciplining is known in the art. A disciplining signal is a signal (e.g. a timing signal) that can be used by a clock discipline module and/or a clock disciplining algorithm.

Figure 14A:
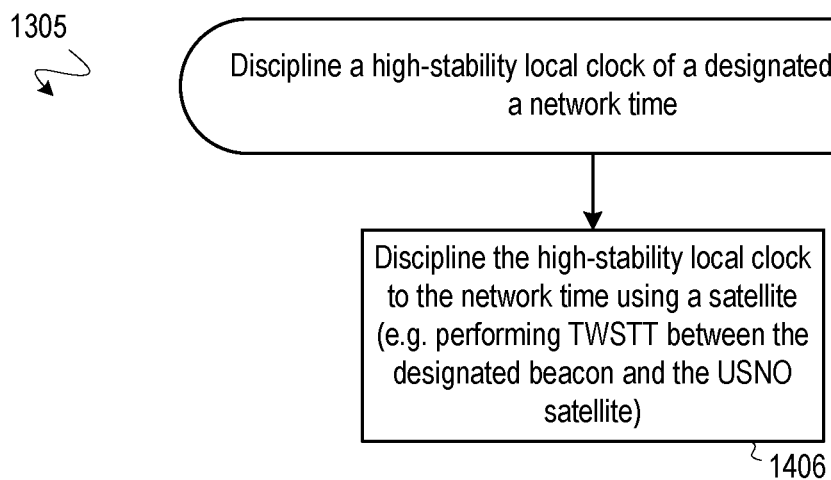
FIG. 14A illustrates functional details of disciplining a high-stability local clock of a designated beacon within a geographic region to a network time using a satellite disciplining-signal source.

Attention is now turned to FIG. 14A, which illustrates functional details of disciplining a high-stability local clock of a designated beacon within a geographic region to a network time using a satellite disciplining-signal source. At step 1406, the high-stability local clock of the designated beacon is disciplined to the network time using a satellite (e.g. by performing TWSTT between the designated beacon and a USNO satellite). In one embodiment, the satellite is not of a GNSS satellite network.

Figure 14B:
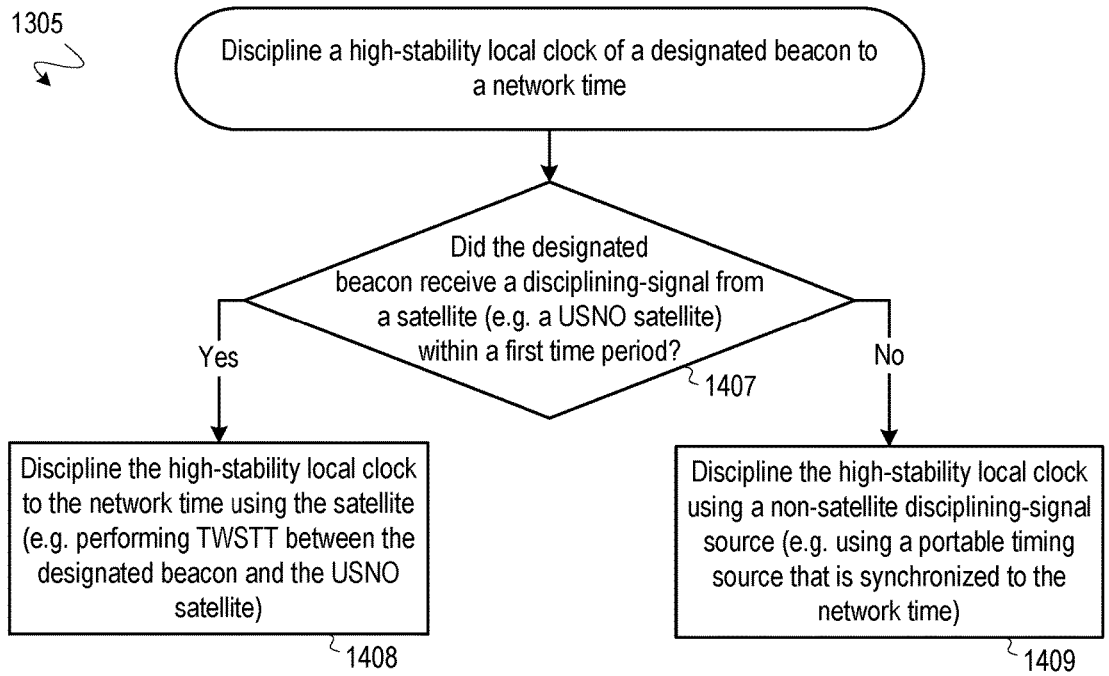
FIG. 14B illustrates functional details of disciplining a high-stability local clock of a designated beacon within a geographic region to a network time using a satellite disciplining-signal source or a non-satellite timing signal source.

Attention is now turned to FIG. 14B, which illustrates functional details of disciplining a high-stability local clock of a designated beacon within a geographic region to a network time using a satellite disciplining-signal source or a non-satellite disciplining-signal source.

At step 1407, it is determined whether the designated beacon received a disciplining-signal from a satellite (e.g. a USNO satellite) within a first time period. That is, it is determined if the designated beacon is able to use the satellite for the purposes of clock disciplining. At step 1408, if the designated beacon has received a disciplining-signal from the satellite within the first period (e.g. within 30 days), the high-stability local clock of the designated beacon is disciplined to the network time using the satellite (e.g. by performing TWSTT between the designated beacon and the USNO satellite).

At step 1409, if the designated beacon has not received a disciplining-signal from the satellite within the first time period, the high-stability local clock of the designated beacon is disciplined to the network time using a non-satellite disciplining-signal source. In one embodiment, a portable timing source (e.g. a portable high-stability clock unit that can be moved or may remain stationary) provides periodic synchronization between a reference clock source (e.g., a National Institute of Standards (NIST) clock source, a USNO clock source, or other clock source) and the high-stability clock at the designated beacon.

Figure 15A:
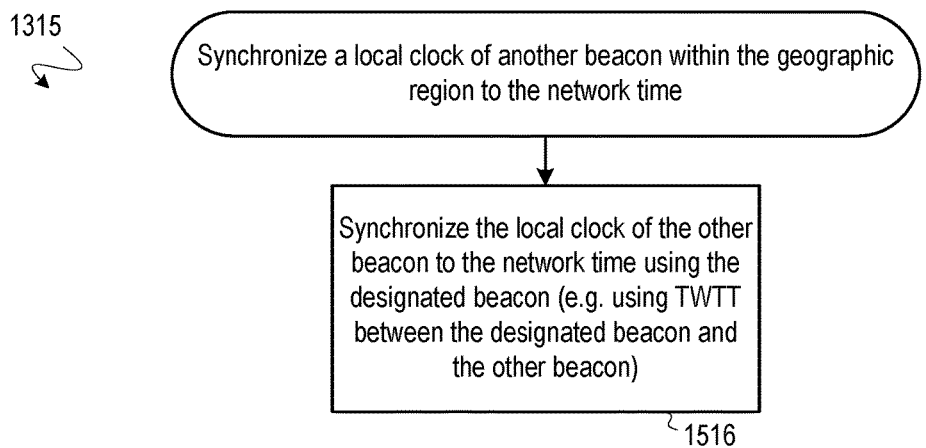
FIG. 15A illustrates functional details of synchronizing a local clock of another beacon within a geographic region to a network time using a designated beacon.

Attention is now turned to FIG. 15A, which illustrates functional details of synchronizing a local clock of another beacon within a geographic region to a network time using a designated beacon. At step 1516, the local clock of the other beacon is synchronized to the network time using the designated beacon (e.g. using TWTT between the designated beacon and the other beacon). In one embodiment, the local clock of the other beacon is synchronized to the high-stability local clock of the designated beacon to within 100 nano-seconds with respect to the high-stability local clock of the designated beacon.

Figure 15B:
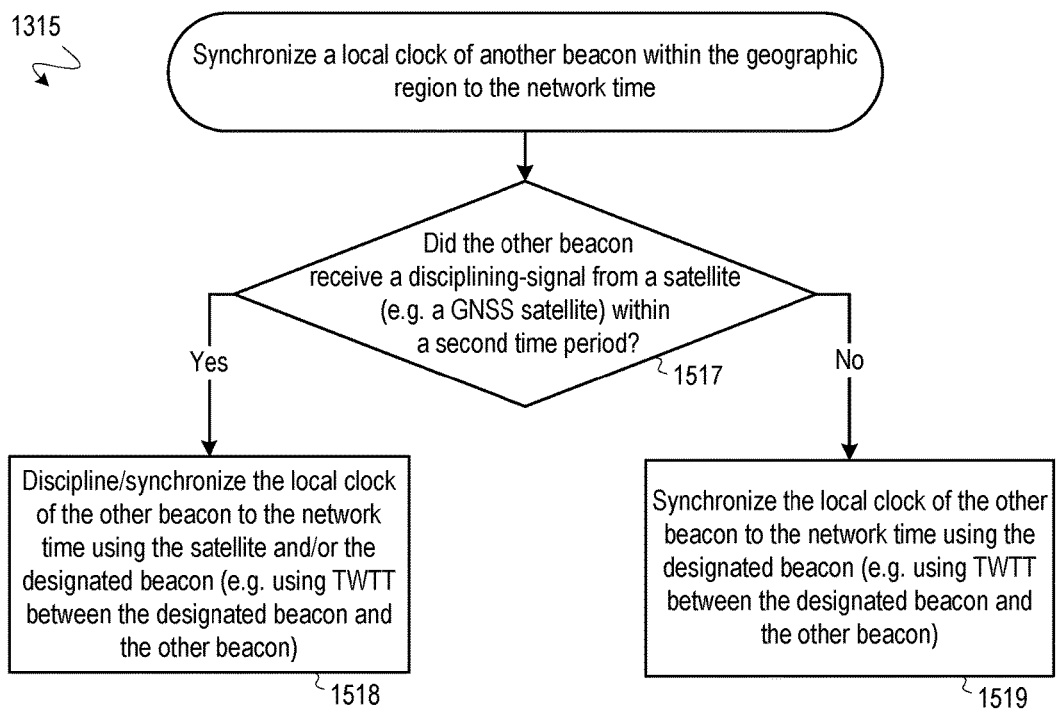
FIG. 15B illustrates functional details of synchronizing a local clock of another beacon within a geographic region to a network time.

Attention is now turned to FIG. 15B, which illustrates functional details of synchronizing a local clock of another beacon within the geographic region to the network time.

At step 1517, it is determined if the other beacon (e.g. a non-designated beacon) received a disciplining-signal from a satellite (e.g. a GNSS satellite) within a second time period (e.g. less than or equal to 24 hours). As was previously discussed, beacons in some embodiments self-synchronize their local clocks using a GNSS receiver and a Rubidium clock located at each of the beacons. At step 1518, if is determined that the other beacon received a disciplining-signal from the satellite, the local clock of the other beacon is synchronized to the network time using either the satellite and/or the designated beacon (e.g. using TWTT between the designated beacon and the other beacon).

At step 1519, if is determined that the other beacon did not receive a disciplining-signal from the satellite, the local clock of the other beacon is synchronized to the network time using the designated beacon (e.g. using TWTT between the designated beacon and the other beacon).

Thus, the beacons of the positioning system can maintain relative timing between each other, in a given geographical area, in the order of a few nano-seconds.

Figure 16:
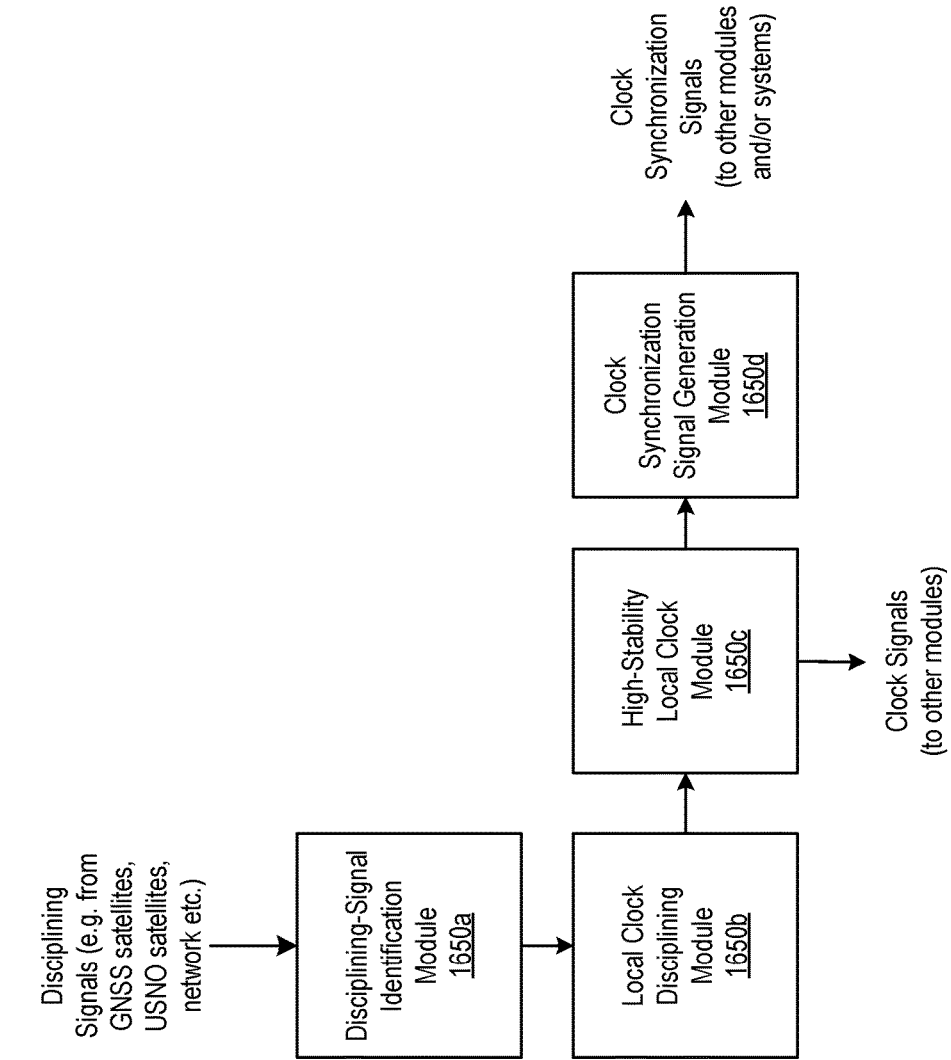
FIG. 16 depicts an embodiment of clock circuitry when it is used for synchronizing a local clock of a beacon to a network time.

Attention is now turned to FIG. 16, which depicts an embodiment of the clock circuitry 250 when it is used for synchronizing the local clock of a beacon to the network time. The clock circuitry module includes various modules that are each operable to carry out different steps of FIG. 14 and FIG. 15. As shown, the modules may include: a disciplining-signal identification module 1650*a*; a local clock disciplining module 1650*b*; a high-stability local clock module 1650*c*; and a clock synchronization signal generation module 1650*d*. The disciplining-signal identification module 1650*a* is coupled to the local clock disciplining module 1650*b*. The local clock disciplining module 1650*b* is coupled to the high-stability local clock module 1650*c*, and the high-stability local clock module 1650*c* is coupled to the clock synchronization signal generation module 1650*d*.

The disciplining-signal identification module 1650*a* is operable to carry out step 1407. The local clock disciplining module 1650*b* is operable to carry out step 1408 and/or 1409. The high-stability local clock module 1650*c* and the clock synchronization signal generation module 1650*d* and another beacon 110 are collectively operable to carry out all or a portion of steps 1518 and/or 1519.

In one embodiment, clock synchronization signals generated by the clock synchronization signal generation module 1650*d* are used when performing TWTT between a designated beacon and another beacon.

In one embodiment, the high-stability local clock module 1650*c* includes a Cesium clock source.

Other Aspects

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a beacon or a mobile can be performed by a server, or vice versa, when appropriate.

Systems comprising one or more modules that perform, are operable to perform, or adapted to perform different method steps/stages disclosed herein are also contemplated, where the modules are implemented using one or more machines listed herein or other suitable hardware.

When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

Signals transmitted by a beacon may carry different information that, once determined by a mobile device 120 or a server, may identify the following: the beacon; the beacon's location (LLA); pressure, temperature, humidity, and/or other conditions at or near the beacon. A mobile device 120 (e.g. a user device) may be in the form of a computing device (e.g., a mobile phone, tablet, laptop, digital camera, tracking tag, or generally a "receiver"), and may include any of: antenna module(s) for exchanging signals with other systems; RF front end module(s) with circuitry components that are known or disclosed herein; processing module(s) for signal processing of received signals to determine position information (e.g., times of arrival or travel time of received signals, atmospheric information from beacons, and/or location or other information associated with each beacon), for using the position information to compute an estimated position of the mobile device 120, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device 120 (e.g., pressure, temperature, humidity, wind, other), which may be compared to the same environmental conditions at or near beacons to determine the altitude of the mobile device 120; other sensor module(s) for measuring other conditions (e.g., acceleration, velocity, orientation, light, sound); interface module(s) for exchanging information with other systems via other links other than a radio link; and/or input/output module(s) for permitting a user to interact with the mobile device 120. Processing by the mobile device 120 can also occur at a server.

It is noted that the term "positioning system" may refer to satellite systems (e.g., Global Navigation Satellite Systems (GNSS) like GPS, GLONASS, Galileo, and Compass/Beidou), terrestrial systems, and hybrid satellite/terrestrial systems.

RELATED APPLICATIONS

This application relates to U.S. Pat. Appl. No. 62/089,138, filed Dec. 8, 2014, entitled TWO WAY TIME TRANSFER USING A TERRESTRIAL BEACON SYSTEM; U.S. Pub. No. 2016/0165562, published Jun. 9, 2016, entitled SYSTEMS AND METHODS FOR SELECTIVELY RECEIVING AND PROCESSING RF SIGNALS AT AN RF BEACON; and U.S. Pat. Appl. No. 62/373,511, filed Aug. 11, 2016, entitled SYSTEMS AND METHODS FOR ASSURED TIME SYNCHRONIZATION OF AN RF BEACON. The content of each of the related applications is hereby incorporated by reference herein in its entirety.

The invention claimed is:

1. A method for synchronizing local time of beacons, wherein the method comprises:
    disciplining a high-stability local clock of a designated beacon within a geographic region to a network time; and
    synchronizing a local clock of a second beacon within the geographic region to the network time,
    wherein disciplining the high-stability local clock of the designated beacon to the network time comprises:
        determining if the designated beacon did not receive a disciplining-signal from a satellite within a first time period; and
        if the designated beacon did not receive a disciplining-signal from a satellite within the first time period, disciplining the high-stability local clock of the designated beacon to the network time using a non-satellite disciplining-signal source.

2. The method of claim 1,
    wherein the high-stability local clock of the designated beacon comprises a timing source that maintains phase synchronization with the network time to within 1 micro-second for a time period of greater than or equal to a month in absence of a disciplining signal, and
    wherein the local clock of the second beacon maintains phase synchronization with the network time to within 1.5 micro-seconds for a time period of less than a month in absence of a disciplining signal.

3. The method of claim 2, wherein the local clock of the second beacon maintains phase synchronization with the network time to within 1.5 micro-seconds for a time period of less than or equal to 24 hours in absence of a disciplining signal.

4. The method of claim 1, wherein the high-stability local clock of the designated beacon comprises a Cesium clock, wherein the local clock of the other beacon does not comprise a Cesium clock, and wherein the geographic region has a 50 Km radius.

5. The method of claim 1, wherein disciplining a high-stability local clock of a designated beacon to a network time comprises:
    if the designated beacon received a disciplining-signal from a satellite within the first time period, disciplining the high-stability local clock of the designated beacon to the network time by performing two-way satellite time transfer between the designated beacon and the satellite.

6. The method of claim 5, wherein the satellite is not a satellite of a GNSS satellite network.

7. The method of claim 1, wherein disciplining the high-stability local clock of the designated beacon to the network time using a non-satellite disciplining-signal source comprises:
    disciplining the high-stability local clock of the designated beacon to the network time using a portable timing source that is synchronized to the network time.

8. The method of claim 1, wherein synchronizing the local clock of the second beacon within the geographic region to the network time comprises:
    synchronizing the local clock of the second beacon to the network time using the designated beacon by performing two-way time transfer between the designated beacon and the second beacon.

9. The method of claim 1, wherein synchronizing the local clock of the second beacon within the geographic region to the network time comprises:
    determining if the second beacon did not receive any disciplining-signal from any satellite within a second time period; and
    if the second beacon did not receive any disciplining-signal from any satellite within the second time period, synchronizing the local clock of the second beacon to the network time using the designated beacon by performing two-way time transfer between the designated beacon and the second beacon.

10. The method of claim 9, wherein the first time period is longer than the second time period, wherein the first time period is less than or equal to 30 days, and the second time period is less than or equal to 24 hours.

11. The method of claim 9, wherein synchronizing the local clock of the second beacon within the geographic region to the network time comprises:
    if the second beacon received any disciplining-signal from any satellite within the second time period, synchronizing the local clock of the second beacon to the network time by performing two-way satellite time transfer between the designated beacon and a satellite that transmitted a received disciplining-signal.

12. A method for synchronizing local time of beacons, wherein the method comprises:
    disciplining a high-stability local clock of a designated beacon within a geographic region to a network time; and
    synchronizing a local clock of a second beacon within the geographic region to the network time,
    wherein the high-stability local clock of the designated beacon comprises a timing source that maintains phase synchronization with the network time to within 1 micro-second for a time period of greater than or equal to a month in absence of a disciplining signal, and
    wherein the local clock of the second beacon maintains phase synchronization with the network time to within 1.5 micro-seconds for a time period of less than a month in absence of a disciplining signal.

13. The method of claim 12, wherein the local clock of the second beacon maintains phase synchronization with the network time to within 1.5 micro-seconds for a time period of less than or equal to 24 hours in absence of a disciplining signal.

14. The method of claim 12, wherein the high-stability local clock of the designated beacon comprises a Cesium clock, and wherein the local clock of the other beacon does not comprise a Cesium clock, wherein the geographic region has a 50 Km radius.

15. One or more non-transitory machine-readable media embodying program instructions that, when executed by one or more machines, cause the one or more machines to implement a method for synchronizing local time of beacons, wherein the method comprises:
   disciplining a high-stability local clock of a designated beacon within a geographic region to a network time; and
   synchronizing a local clock of a second beacon within the geographic region to the network time,
   wherein disciplining the high-stability local clock of the designated beacon to the network time comprises:
      determining if the designated beacon did not receive a disciplining-signal from a satellite within a first time period; and
      if the designated beacon did not receive a disciplining-signal from a satellite within the first time period, disciplining the high-stability local clock of the designated beacon to the network time using a non-satellite disciplining-signal source.

16. The one or more non-transitory machine-readable media of claim 15,
   wherein the high-stability local clock of the designated beacon comprises a timing source that maintains phase synchronization with the network time to within 1 micro-second for a time period of greater than or equal to a month in absence of a disciplining signal, and
   wherein the local clock of the second beacon maintains phase synchronization with the network time to within 1.5 micro-seconds for a time period of less than a month in absence of a disciplining signal.

17. The one or more non-transitory machine-readable media of claim 16, wherein the local clock of the second beacon maintains phase synchronization with the network time to within 1.5 micro-seconds for a time period of less than or equal to 24 hours in absence of a disciplining signal.

18. The one or more non-transitory machine-readable media of claim 15, wherein the high-stability local clock of the designated beacon comprises a Cesium clock, wherein the local clock of the other beacon does not comprise a Cesium clock, and wherein the geographic region has a 50 Km radius.

19. The one or more non-transitory machine-readable media of claim 15, wherein disciplining a high-stability local clock of a designated beacon to a network time comprises:
   if the designated beacon received a disciplining-signal from a satellite within the first time period, disciplining the high-stability local clock of the designated beacon to the network time by performing two-way satellite time transfer between the designated beacon and the satellite.

20. The one or more non-transitory machine-readable media of claim 19, wherein the satellite is not a satellite of a GNSS satellite network.

21. The one or more non-transitory machine-readable media of claim 15, wherein disciplining the high-stability local clock of the designated beacon to the network time using a non-satellite disciplining-signal source comprises:
   disciplining the high-stability local clock of the designated beacon to the network time using a portable timing source that is synchronized to the network time.

22. The one or more non-transitory machine-readable media of claim 15, wherein synchronizing the local clock of the second beacon within the geographic region to the network time comprises:
   synchronizing the local clock of the second beacon to the network time using the designated beacon by performing two-way time transfer between the designated beacon and the second beacon.

23. The one or more non-transitory machine-readable media of claim 15, wherein synchronizing the local clock of the second beacon within the geographic region to the network time comprises:
   determining if the second beacon did not receive any disciplining-signal from any satellite within a second time period; and
   if the second beacon did not receive a disciplining-signal from any satellite within the second time period, synchronizing the local clock of the second beacon to the network time using the designated beacon by performing two-way time transfer between the designated beacon and the second beacon.

24. The one or more non-transitory machine-readable media of claim 23, wherein the first time period is longer than the second time period, wherein the first time period is less than or equal to 30 days, and the second time period is less than or equal to 24 hours.

25. The one or more non-transitory machine-readable media of claim 23, wherein synchronizing the local clock of the second beacon within the geographic region to the network time comprises:
   if the second beacon received any disciplining-signal from any satellite within the second time period, synchronizing the local clock of the second beacon to the network time by performing two-way satellite time transfer between the designated beacon and a satellite that transmitted a received disciplining-signal.

26. One or more non-transitory machine-readable media embodying program instructions that, when executed by one or more machines, cause the one or more machines to implement a method for synchronizing local time of beacons, wherein the method comprises:
   disciplining a high-stability local clock of a designated beacon within a geographic region to a network time; and
   synchronizing a local clock of a second beacon within the geographic region to the network time,
   wherein the high-stability local clock of the designated beacon comprises a timing source that maintains phase synchronization with the network time to within 1 micro-second for a time period of greater than or equal to a month in absence of a disciplining signal, and
   wherein the local clock of the second beacon maintains phase synchronization with the network time to within 1.5 micro-seconds for a time period of less than a month in absence of a disciplining signal.

27. The one or more non-transitory machine-readable media of claim 26, wherein the local clock of the second beacon maintains phase synchronization with the network time to within 1.5 micro-seconds for a time period of less than or equal to 24 hours in absence of a disciplining signal.

28. The one or more non-transitory machine-readable media of claim 26, wherein the high-stability local clock of the designated beacon comprises a Cesium clock, and wherein the local clock of the other beacon does not comprise a Cesium clock, wherein the geographic region has a 50 Km radius.

* * * * *